US010920821B2

(12) United States Patent
Imai et al.

(10) Patent No.: US 10,920,821 B2
(45) Date of Patent: Feb. 16, 2021

(54) TERMINAL SECURING DEVICE

(71) Applicant: CHUO HATSUJO KABUSHIKI KAISHA, Nagoya (JP)

(72) Inventors: Kenta Imai, Nagoya (JP); Shinji Okamoto, Nagoya (JP); Seiji Yamada, Nagoya (JP)

(73) Assignee: CHUO HATSUJO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/646,431

(22) PCT Filed: Jul. 24, 2018

(86) PCT No.: PCT/JP2018/027761
§ 371 (c)(1),
(2) Date: Mar. 11, 2020

(87) PCT Pub. No.: WO2019/097765
PCT Pub. Date: May 23, 2019

(65) Prior Publication Data
US 2020/0277983 A1 Sep. 3, 2020

(30) Foreign Application Priority Data
Nov. 16, 2017 (JP) .................. 2017-220669

(51) Int. Cl.
| | | |
|---|---|---|
| F16C 1/14 | (2006.01) | |
| F16C 1/22 | (2006.01) | |
| F16C 1/26 | (2006.01) | |

(52) U.S. Cl.
CPC ............ *F16C 1/145* (2013.01); *F16C 1/14* (2013.01); *F16C 1/223* (2013.01); *F16C 1/262* (2013.01); *F16C 2226/74* (2013.01)

(58) Field of Classification Search
CPC .... F16C 1/08; F16C 1/10; F16C 1/102; F16C 1/103; F16C 1/105; F16C 1/14;
(Continued)

(56) References Cited

U.S. PATENT DOCUMENTS

| | | | |
|---|---|---|---|
| 9,038,496 B2 * | 5/2015 | Horinaka | F16C 1/223 74/502.4 |
| 2006/0230868 A1 * | 10/2006 | Ruhlander | F16C 1/14 74/501.5 R |

(Continued)

FOREIGN PATENT DOCUMENTS

| | | |
|---|---|---|
| CN | 101184927 A | 5/2008 |
| CN | 101375067 A | 2/2009 |

(Continued)

OTHER PUBLICATIONS

International Search Report and Written Opinion for corresponding International Patent Application No. PCT/JP2018/027761, dated Oct. 30, 2018.

*Primary Examiner* — Prasad V Gokhale
(74) *Attorney, Agent, or Firm* — Mai-Tram D. Lauer; Westman, Champlin & Koehler, P.A.

(57) ABSTRACT

[Problem] To provide a terminal securing device the size of which can be reduced. [Solution] When a key lock 7 is positioned in a second position a key 6 and the key lock 7 are arranged at overlapping positions in the lengthwise direction of a rod 3, so a portion of a space for displacing the key lock 7 from the second position to a first position can be provided at a position overlapping the key 6 in the lengthwise direction of the rod 3. Thus, an increase in the size of a holder 4 in the lengthwise direction of the rod 3 can be avoided, so the size of the terminal securing device 1 can be reduced.

3 Claims, 7 Drawing Sheets

(58) Field of Classification Search
CPC .. F16C 1/145; F16C 1/22; F16C 1/223; F16C 1/262; F16C 2226/74; F16C 2226/62; F16C 2226/76; B64C 13/30
See application file for complete search history.

(56) References Cited

U.S. PATENT DOCUMENTS

2009/0049947 A1\* 2/2009 Horinaka .................. F16C 1/14
    74/502.4
2019/0154077 A1\* 5/2019 Biaggini ................ F16C 1/223

FOREIGN PATENT DOCUMENTS

| EP | 1875087 A2 | 1/2008 | |
|----|------------|--------|---|
| JP | 2003166521 A | 6/2003 | |
| JP | 2004353700 A | 12/2004 | |
| JP | 2005147393 A | 6/2005 | |
| JP | 200657764 A | 3/2006 | |
| JP | 2007205366 A | 8/2007 | |
| JP | 2008095866 A \* | 4/2008 | ............... F16C 1/14 |
| JP | 2008309203 A | 12/2008 | |
| KR | 101419326 51 | 7/2014 | |
| WO | 2006113604 A2 | 10/2006 | |
| WO | 2007086572 A1 | 8/2007 | |

\* cited by examiner

TERMINAL SECURING DEVICE

CROSS-REFERENCE TO RELATED APPLICATION

This Application is a Section 371 National Stage Application of International Application No. PCT/JP2018/027761, filed Jul. 24, 2018 and published as WO/2019/097765 on May 23, 2019, in Japanese. International Application No. PCT/JP2018/027761 claims the benefit of priority of Japanese application JP 2017-220669, filed Nov. 16, 2017.

TECHNICAL FIELD

The present disclosure relates to a terminal securing device, in particular to a terminal (end) securing device that can be miniaturized.

BACKGROUND ART

There is known a terminal securing device for securing a terminal of a control cable (for example, a component transmitting an operation state of a shift lever at an operating side to a transmission at an operated side). The terminal securing device has a rod configured at an end of the control cable, a holder supporting the rod, a key engaged with the rod supported by the holder and a key lock securing a locked state of the key (a state in which the key is engaged with the rod).

The holder is secured on a pin provided at the operating side or the operated side, and in a state in which a relative position of the rod with respect to the holder is set at a desired position, the key is engaged with the rod, thereby bringing a locked state. The locked state is secured by the key lock, so that a length of the control cable can be adjusted.

For such a terminal securing device, for example, in a patent document 1, it is disclosed a terminal securing device having a key lock (sliding member) that is relatively displaced with respect to a holder. In this terminal securing device, a temporarily locked state in which the key (locking piece) is not engaged with the rod and a locked state in which the key is engaged with the rod are maintained by the key lock. Therefore, according to the terminal securing device, the locked state or the temporarily locked state can be prevented, by one key lock, from being released due to an erroneous operation.

SUMMARY

Problem to be Solved by the Present Disclosure

However, in the above-described conventional technique, the key lock is configured on an outer surface of the holder at one end side (an opposite side to the side where the pin is secured) in the length direction of the rod. Therefore, in order to ensure a space for sliding displacement of the key lock, the dimension of the holder in the length direction of the rod needs to be set long.

On the contrary, for example, if the key lock is provided at the other end side (the side where the pin is secured) in the length direction of the rod, the key lock may hinder an operation of inserting the pin through the holder, and therefore the key lock needs to be configured at a position spaced apart from the pin by a predetermined interval in the length direction of the rod. Therefore, the dimension of the holder in the length direction of the rod needs to be set long, therefore, there is a problem that the terminal securing device becomes large.

The present disclosure has been made to solve the above problem, and an object thereof is to provide a terminal securing device that can be miniaturized.

Means for Solving the Problem

In order to achieve this object, a terminal securing device of the present disclosure has: a control cable, a rod, configured at an end of the control cable, a holder, supporting the rod, a key, being slidably displaced with respect to the holder so as to be engaged with the rod, and a key lock, being displaced between a first position restricting the sliding displacement of the key and a second position allowing the sliding displacement of the key; through the key lock located in the first position, the sliding displacement of the key is restricted in both a temporarily locked state and a locked state, the temporarily locked state is a state in which the key is not engaged with the rod, and the locked stated is a state in which the key is engaged with the rod, and when the key lock is located in the second position, the key and the key lock are located such that the key and the key lock overlap with each other in a length direction of the rod.

Effect of the Present Disclosure

According to the terminal securing device in a first technical solution, when the key lock is located in the second position, the key and the key lock are located such that the key and the key lock overlap with each other in the length direction of the rod, therefore, a part of a space for displacing the key lock from the second position to the first position can be provided at a position overlapping the key in the length direction of the rod. Thus, the dimension of the holder in the length direction of the rod can be prevented from becoming long, therefore rendering the effect that the terminal securing device can be miniaturized.

According to the terminal securing device in a second technical solution, apart from the effect produced by the terminal securing device in the first technical solution, there are further the following effects. The terminal securing device has restricting portions, and the restricting portions are respectively formed on the key and the key lock, and restrict the displacement of the key lock through engagement with each other, and in both the temporarily locked state and the locked state, the key lock is restricted by the restricting portions from being displaced from the first position to the second position. Thus, by means of one and the same restricting portion, the temporarily locked state can be restricted from being released and the locked state can be restricted from being released, respectively. Therefore, compared with the case where the temporarily locked state is restricted from being released and the locked state is restricted from being released by different restricting portions, respectively, the number of restricting portions formed can be reduced. Therefore, there is the effect of being capable of reducing the product cost of the terminal securing device.

According to the terminal securing device in a third technical solution, apart from the effect produced by the terminal securing device in the first technical solution, there are further the following effects. The holder has a through hole formed on a side wall surrounding the key, and in the locked state, the key lock is engaged with the side wall via the through hole, therefore, it is not necessary to additionally provide, on an outer side of the side wall, a part for enabling the key lock to be engaged with the holder in the locked state. Thus there is the effect of being capable of miniaturizing the terminal securing device.

According to the terminal securing device in a fourth technical solution, apart from the effect produced by the terminal securing device in the third technical solution, there are further the following effects. In the temporarily locked state, the key lock is not engaged with the holder, allowing the key lock to be displaced from the first position to the second position, therefore, compared with the locked state in which the key lock is engaged with the side wall of the holder, the temporarily locked state can be relatively easily released. Thus, there is the effect of being capable of improving the workability of the operation of adjusting the length of the control cable.

DETAILED DESCRIPTION OF EMBODIMENTS

Figure 1:
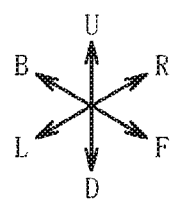
FIG. 1 is a perspective view of a terminal securing device in a first embodiment of the present disclosure.
Figure 1:
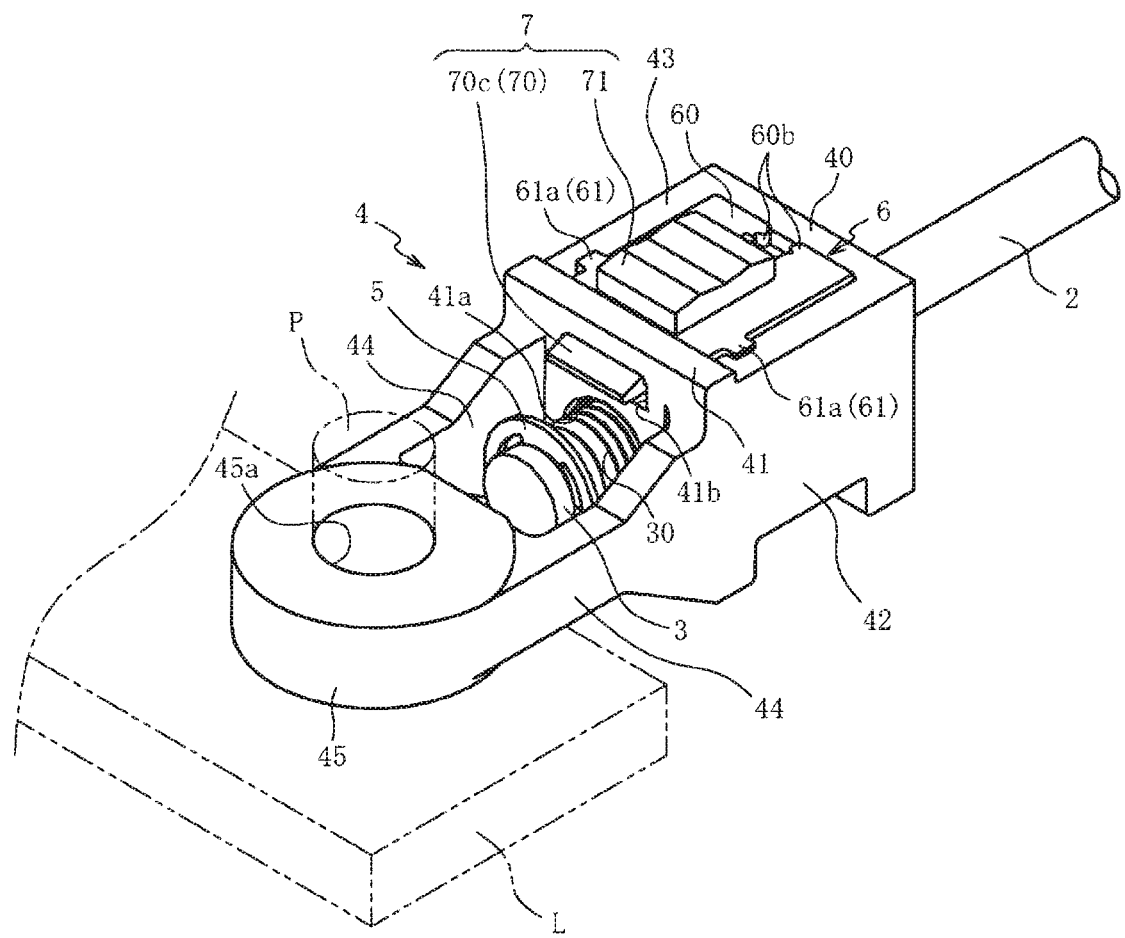

Preferred embodiments of the present disclosure are described below with reference to the accompanying drawings. First, referring to FIG. 1, an overall structure of a terminal securing device 1 is illustrated. FIG. 1 is a perspective view of the terminal securing device 1 in a first embodiment of the present disclosure. Further, in FIG. 1, a gear lever L is schematically shown by two-dot chain line for easy understanding. In addition, arrows U-D, L-R, and F-B in FIG. 1 show an up-down direction, a left-right direction, and a front-back direction of the terminal securing device 1, respectively, and the same is applied to FIG. 2 to FIG. 7C. In addition, the up-down direction of the terminal securing device 1 is corresponding to a sliding direction of a key 6, the left-right direction is corresponding to a length direction (insertion direction) of a rod 3, and the front-back direction is corresponding to a direction perpendicular to the sliding direction of the key 6 and the length direction of the rod 3.

As shown in FIG. 1, the terminal securing device 1 is a device for adjusting a length of a control cable 2 between a device (which is a gear lever L in the present embodiment) at an operating side and a device (which is a transmission in the present embodiment) (not shown in drawings) at an operated side when mounting the control cable 2.

The terminal securing device 1 has: the control cable 2; the rod 3 secured at an end of the control cable 2; a holder 4, supporting the rod 3 and secured to a pin P of the gear lever L; an E-shaped ring 5 preventing the rod 3 from falling off the holder 4; a key 6 engaged with the rod 3 being in a state of being supported by the holder 4; and a key lock 7 for securing the engaged state of the key 6 with the rod 3.

The control cable 2 is a cable that connects the gear lever L and the transmission and transmits an operating state of the gear lever L to the transmission. The rod 3 that is cylindrical and configured at a front end of the control cable 2 is secured by the holder 4, thereby adjusting the length of the control cable 2 (a relative position with respect to the holder 4).

The rod 3 has groove portions 30, and the groove portions 30 are formed on an outer periphery of the rod 3 and formed at equal interval in the length direction of the rod 3 at predetermined pitch, and the rod 3 is secured to the holder 4 by engaging the key 6 with the groove portions 30. The key lock 7 is a member for securing the engaged state of the rod 3 with the key 6.

Figure 2:
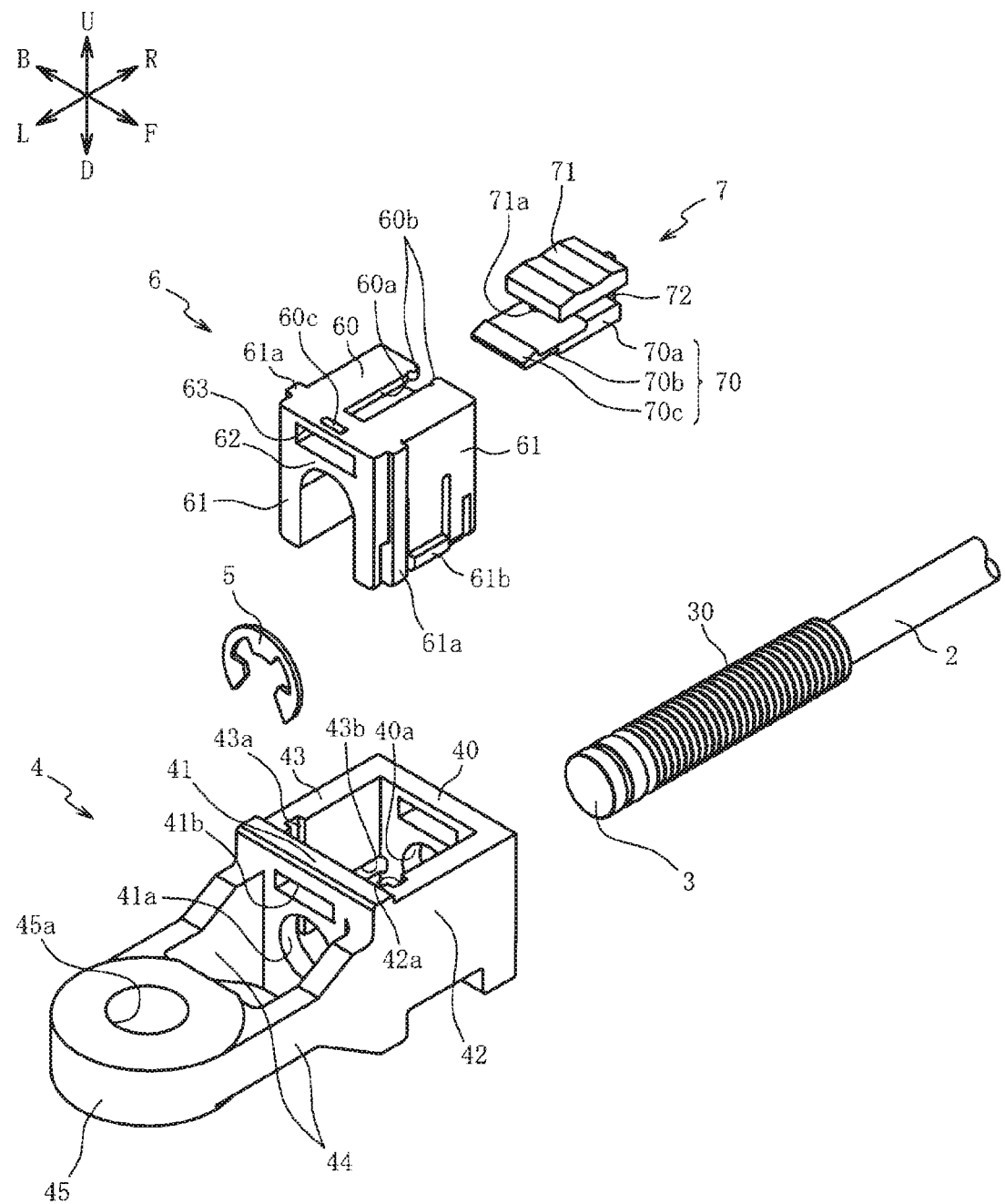
FIG. 2 is an exploded perspective view of the terminal securing device.

Next, detailed structures of each part of the terminal securing device 1 is illustrated with reference to FIG. 2. FIG. 2 is an exploded perspective view of the terminal securing device 1. Besides, in the following description, the side of the holder 4 configured with the pin P is defined as "one end side", and the opposite side thereof is defined as "the other end side", in the length direction (arrow L-R direction) of the rod 3.

The holder 4 has: a first side wall 40, configured at the other end side of the holder 4; a second side wall 41, facing the first side wall 40 in the length direction of the rod 3 and configured at a position closer to one end side of the holder 4 with respect to the first side wall 40; a third side wall 42 and a fourth side wall 43, connecting the first side wall 40 and the second side wall 41 to each other in the length direction of the rod 3; a pair of extending portions 44, extending from the second side wall 41 to one end side of the holder 4; and a securing portion 45, connected to one end side of the pair of extending portions 44 and secures the pin P of the gear lever L.

On the first side wall 40 and the second side wall 41, through holes 40a and 41a having a circular cross section and penetrating through the first side wall and the second side wall along the length direction of the rod 3 are formed respectively. The pair of extending portions 44 are respectively provided in a manner of sandwiching the through hole 41a of the second side wall 41 with a predetermined interval in the front-back direction (arrow F-B direction). Thereby, a space surrounded by the second side wall 41, the pair of extending portions 44 and the securing portion 45 is formed. Therefore, by inserting the rod 3 through the through holes 40a and 41a, a front end of the rod 3 is exposed from the space (see FIG. 1), thus an operator can be allowed to easily visually confirm a relative position of the rod 3 with respect to the holder 4.

By mounting an E-shaped ring 5 at the front end of the rod 3 in a state in which the rod 3 is inserted through the through holes 40a and 41a, the E-shaped ring 5 will still abut against an outer surface of the second side wall 41 even if the rod 3 attempts to be displaced toward the other end side of the holder 4. Therefore, the rod 3 can be prevented from falling off the holder 4 (through hole 41a).

Further, on the second side wall 41, a through hole 41b for inserting a base portion 70b and a claw portion 70c of the key lock 7 is formed. The through hole 41b is configured as a through hole having a rectangular cross section and formed along the length direction of the rod 3.

A through hole 45a having a circular cross section and penetrating vertically is formed in the securing portion 45, and a bush (not shown in drawings) is configured on an inner peripheral surface of the through hole 45a. The holder 4 is secured to the gear lever L by inserting the pin P (see FIG. 1) of the gear lever L through the through hole 45a.

In inner surfaces of the third side wall 42 and the fourth side wall 43, guide grooves 42a and 43a extending vertically are formed respectively, and the sliding displacement of the key 6 is guided along the guide grooves 42a and 43a. Further, in the inner surfaces of the third side wall 42 and the fourth side wall 43, engaging grooves 42b and 43b (see FIG. 5 for the engaging groove 42b) extending in the length direction of the rod 3 are formed. The engaging grooves 42b and 43b are parts for engaging (hooking) the engaging portions 61b of the key 6 in the temporarily locked state described later.

The key 6 is formed in a substantially cuboid shape, therefore, the key 6 can be accommodated in a space surrounded by the first side wall 40 to the fourth side wall 43 and having a rectangular cross section. The key 6 has an upper plate portion 60 constituting an upper surface thereof, a pair of leg portions 61 respectively extending downward from a front end (an end portion on the arrow F side) and a rear end (an end portion on the arrow B side) of the upper plate portion 60, and an intermediate plate portion 62 connecting the pair of leg portions 61 to each other, under the upper plate portion 60, each portion being formed in a substantially flat plate shape.

On outer surfaces of the pair of leg portions 61, convex sliding portions 61a are formed in a manner of extending vertically at the sides of the third side wall 42 and the fourth side wall 43, and the key 6 is relatively displaced with respect to the holder 4 by sliding the sliding portions 61a along the guide grooves 42a and 43a. Besides, at lower ends of the pair of leg portions 61, convex engaging portions 61b are formed in a manner of extending in the length direction of the rod 3 at the sides of the third side wall 42 and the fourth side wall 43.

A lower surface of the intermediate plate portion 62 is configured as a curved surface that is upwardly convex and connects the pair of leg portions 61 to each other, and the groove portions 62a (see FIGS. 3A-3B) are formed in the curved surface. The groove portions 62a are configured as a plurality of grooves formed at equal interval with a predetermined pitch in the length direction of the rod 3, and can be engaged with the groove portions 30 of the rod 3.

In the key 6, a through hole 63 surrounded by the upper plate portion 60, the pair of leg portions 61 and the intermediate plate portion 62 is formed. The through hole 63 is a through hole having a rectangular cross section and connecting end portions (end portions at the arrow L-R side) of the key 6 in the length direction of the rod 3, and a locking portion 70 of a key lock 7 described later is inserted through the through hole 63.

The upper plate portion 60 has: a notch portion 60a extending along the length direction of the rod 3 to one end side from the other end side (an end portion at the arrow R side) of the key 6; a pair of projecting portions 60b projecting (facing each other) toward a center side in the front-back direction (arrow F-B direction) of the key 6, at an end portion of the other end side of the notch portion 60a; and a restricting portion 60c formed on an upper surface, close to one end side of the key 6 with respect to the notch portion 60a.

The notch portion 60a is a part for inserting a coupling portion 72 of the key lock 7 described later, and the projecting portions 60b are parts for preventing the coupling portion 72 inserted in the notch portion 60a from falling off from the notch portion 60a. The notch portion 60a is formed at a center of the upper plate portion 60 in the front-back direction (arrow F-B direction), and the dimension of the notch portion 60a in the front-back direction of the key 6 is set larger than a facing distance between the pair of projecting portions 60b.

The restricting portion 60c is a part for engaging a restricting portion 71a of the key lock 7 described later, and is configured as a projection projecting upward from the upper surface of the upper plate portion 60.

The key lock 7 is a member that restricts the sliding displacement of the key 6 with respect to the holder 4. The key lock 7 has: a locking portion 70 which is inserted through the through hole 63 of the key 6; an operating portion 71 for operating the sliding displacement of the locking portion 70; and the coupling portion 72 that couples the locking portion 70 and the operating portion 71.

The locking portion 70 has: a cuboid-shaped sliding portion 70a, of which an outline shape is formed in a shape corresponding to the shape of an inner surface of the through hole 63; a plate-shaped base portion 70b extending from the sliding portion 70a to one end side of the key lock 7; and a claw portion 70c provided at an end portion of one end side of the base portion 70b, and protruding towards an upper side.

The dimension of the through hole 63 in the up-down direction of the key 6 is set to be substantially the same as (or slightly larger than) the dimension of the sliding portion 70a, and the dimension of the through hole 63 in the front-back direction (arrow F-B direction) of the key 6 is set to be substantially the same as (or slightly larger than) the dimension of the sliding portion 70a. Thus, the sliding portion 70a can slide inside the through hole 63 along the length direction of the rod 3 in a state in which the sliding portion 70a is constrained by the upper plate portion 60, the pair of leg portions 61 and the intermediate plate portion 62 of the key 6 (see FIGS. 5A-5B).

The operating portion 71 has the restricting portion 71a, and this restricting portion 71a is formed on a lower surface of the operating portion 71 and is configured as a projection protruding downward. By engaging the restricting portion 71a with the restricting portion 60c of the key 6, the sliding displacement of the key lock 7 with respect to the key 6 is restricted.

The coupling portion 72 is formed in a substantially cuboid shape, and a dimension thereof in the front-back direction (arrow F-B direction) is set to be substantially the same as (or slightly smaller than) the dimension of the notch portion 60a of the key 6 and is set to be greater than a facing distance between the pair of projecting portions 60b. Thus, if the coupling portion 72 is inserted between the pair of projecting portions 60b facing each other, the upper plate portion 60 is enabled to be deformed elastically through abutment between the projecting portions 60b and the coupling portion 72. Through the elastic deformation, the coupling portion 72 can be inserted into the notch portion 60a, and on the other hand, after insertion in the notch portion 60a, the pair of projecting portions 60b return to initial positions due to an elastic restoring force of the upper plate portion 60 (a state before the coupling portion 72 is inserted). Thus, the coupling portion 72 is restricted from falling off from the notch portion 60a through the pair of projecting portions 60b.

Figure 3A:
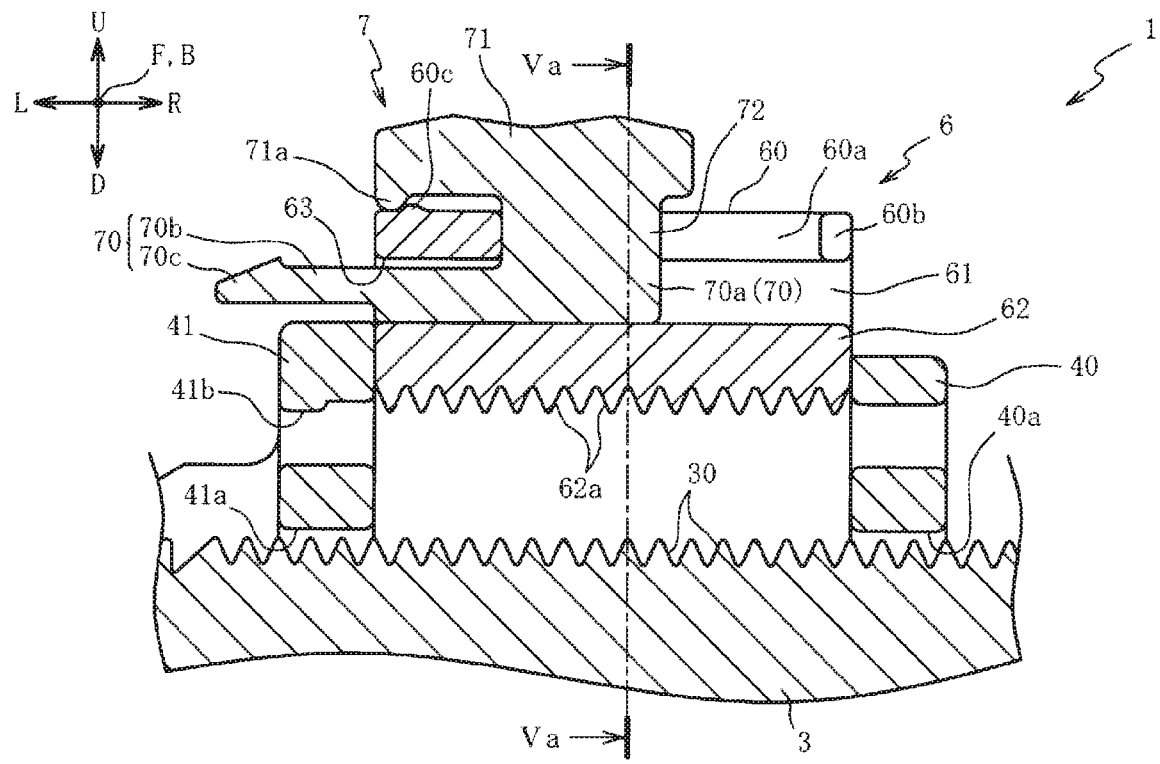
FIG. 3A is a partially enlarged sectional view of the terminal securing device in a temporarily locked state.
Figure 3B:
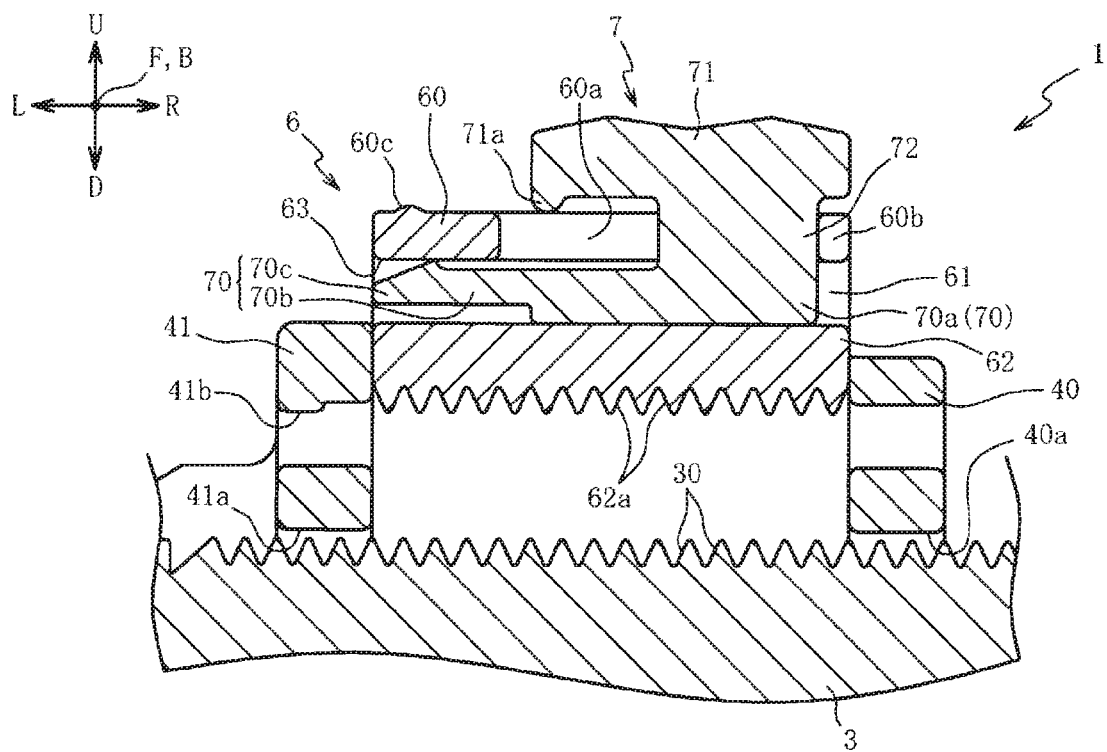
FIG. 3B is a partially enlarged sectional view showing the terminal securing device from the state of FIG. 3A to a state of displacing the key lock to a second position.
Figure 4A:
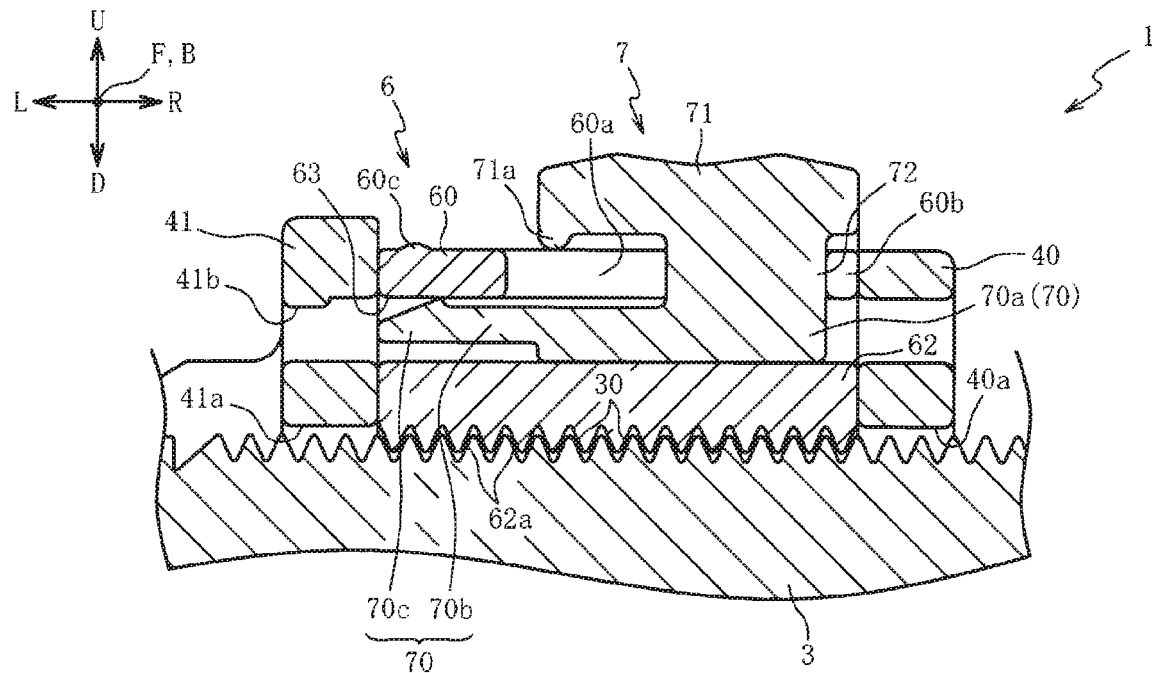
FIG. 4A is a partially enlarged sectional view showing the terminal securing device from the state of FIG. 3B to a locked state in which a key is engaged with the rod.
Figure 4B:
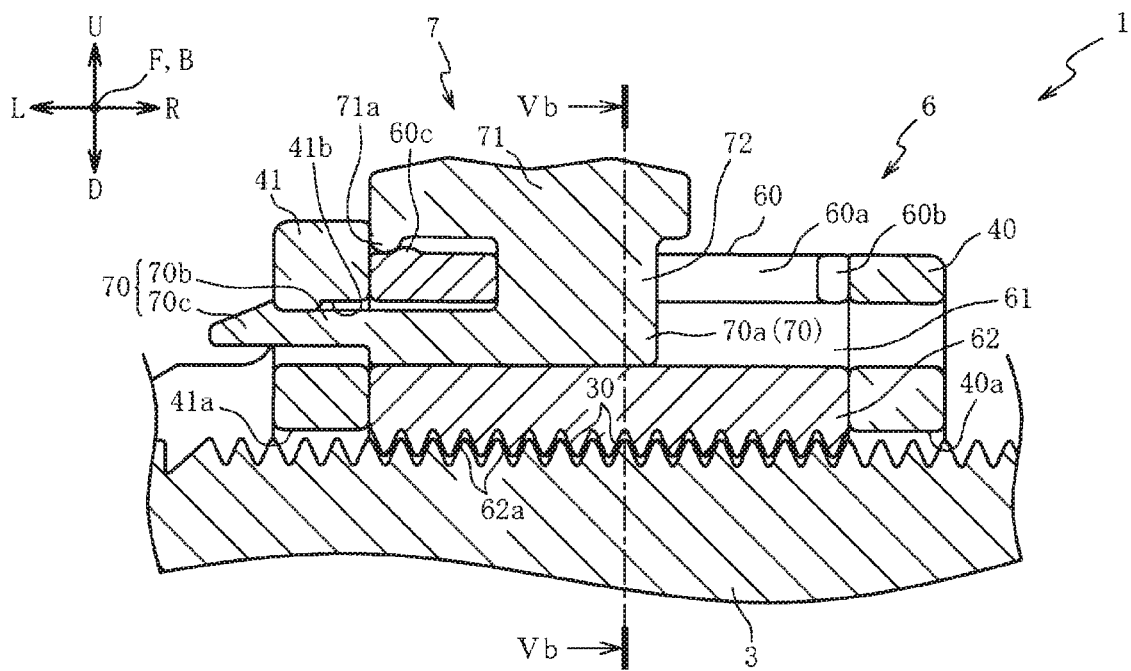
FIG. 4B is a partially enlarged sectional view showing the terminal securing device from the state of FIG. 4A to a state of displacing the key lock to the first position.
Figure 5A:
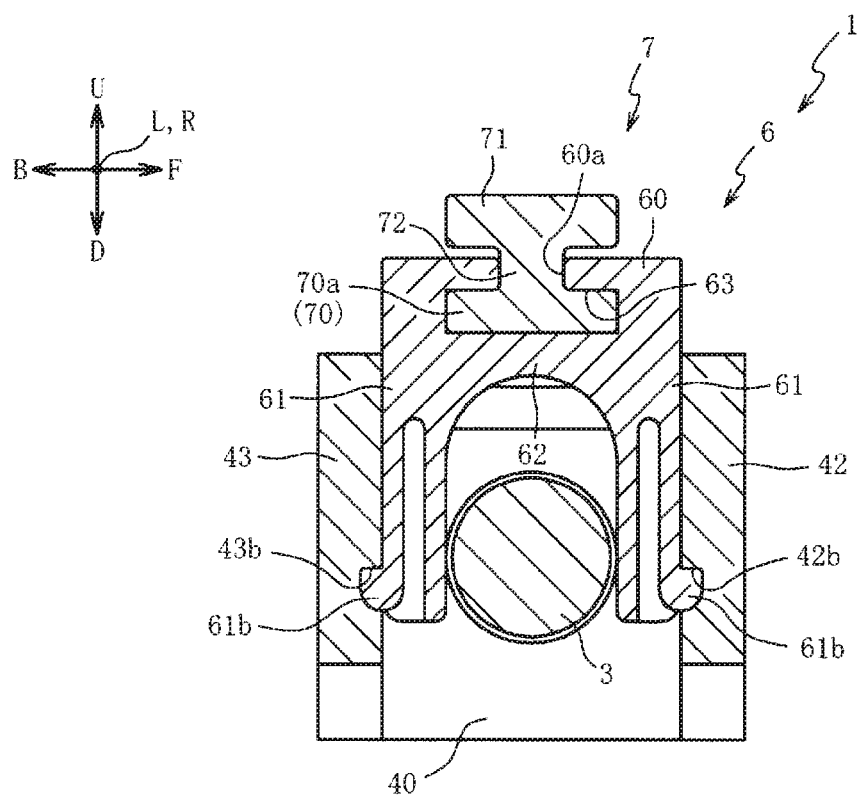
FIG. 5A is a partially enlarged sectional view of the terminal securing device along a line Va-Va in FIG. 3A.
Figure 5B:
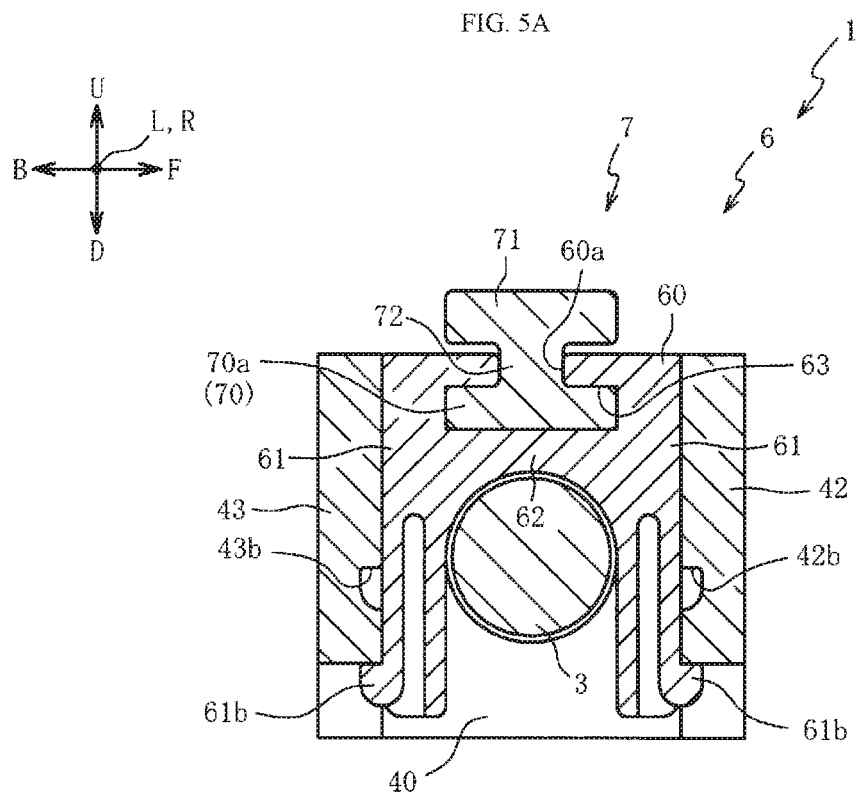
FIG. 5B is a partially enlarged sectional view of the terminal securing device along a line Vb-Vb in FIG. 4B.

Next, a temporarily locked state and a locked state of the terminal securing device 1 are illustrated with reference to FIG. 3A FIG. 5B. FIG. 3A is a partially enlarged sectional view of the terminal securing device 1 in a temporarily locked state, and FIG. 3B is a partially enlarged sectional view showing the terminal securing device 1 from the state of FIG. 3A to a state of displacing the key lock 7 to a second position. FIG. 4A is a partially enlarged sectional view showing the terminal securing device 1 from the state of FIG. 3B to a locked state in which a key 6 is engaged with the rod 3, and FIG. 4B is a partially enlarged sectional view showing the terminal securing device 1 from the state of FIG. 4A to a state of displacing the key lock 7 to the first position. FIG. 5A is a partially enlarged sectional view of the terminal securing device 1 along a line Va-Va in FIG. 3A, and FIG. 5B is a partially enlarged sectional view of the terminal securing device 1 along a line Vb-Vb in FIG. 4B. Besides, in FIG. 3A-FIG. 5B, in order to simplify the accompanying drawings, the drawings are shown in a manner of partially omitting the groove portions 62a of the key 6.

Besides, in the following description, a following position is defined as a first position of the key lock 7, that is, a position where the coupling portion 72 of the key lock 7 is located at one end side of the notch portion 60a (the coupling portion 72 abuts against the upper plate portion 60) and the base portion 70b and the claw portion 70c are exposed from the through hole 63. Besides, a following position is defined as a second position of the key lock 7, that is, a position where the coupling portion 72 is located at the other end side of the notch portion 60a (the coupling portion 72 abuts against the projecting portion 60b) and the base portion 70b and the claw portion 70c are accommodated inside the through hole 63.

In addition, a state in which the groove portions 62a of the key 6 are not engaged with the groove portions 30 of the rod 3 (the state in FIGS. 3A and 3B) is defined as a temporarily locked state, and a state in which the groove portions 62a of the key 6 are engaged with the groove portions 30 of the rod 3 (the state in FIGS. 4A and 4B) is defined as a locked state. The temporarily locked state is a state in which the relative position of the rod 3 with respect to the holder 4 (the length of the control cable 2) can be changed. When the rod 3 is configured in a state of being in a desired position, the temporarily locked state is switched to the locked state, thereby adjusting the length of the control cable 2.

As shown in FIGS. 3A and 3B, in the temporarily locked state, the through hole 63 of the key 6 is located at an upper side of an upper surface of the second side wall 41, and in this state, by enabling the key lock 7 to be located at the first position, the base portion 70b and the claw portion 70c of the key lock 7 are exposed from an upper surface side of the second side wall 41. In this case, as lower surfaces of the base portion 70b and the claw portion 70c are formed to be parallel to the upper surface of the second side wall 41, the base portion 70b abuts against the upper surface of the second side wall 41 even if the key 6 attempts to be displaced from the temporarily locked state to the side of the rod 3. That is, in the temporarily locked state, even if the key 6 is pushed toward the side of the rod 3 due to an erroneous operation, the state will not be switched to the locked state until the base portion 70b is damaged, therefore, the temporarily locked state can be firmly maintained.

In addition, when the key lock 7 is located in the first position, the restricting portion 71a of the operating portion 71 is located closer to one end side (arrow L side) of the upper plate portion 60 with respect to the restricting portion 60c of the upper plate portion 60 (the restricting portion 60c is engaged with the restricting portion 71a). Thereby, the displacement of the key lock 7 from the first position to the second position is restricted until the restricting portion 71a passes over the restricting portion 60c (the engaged state between the restricting portion 71a and the restricting portion 60c is released). Therefore, the securing of the key lock 7 in the temporarily locked state can be prevented from being released due to an erroneous operation.

In a situation where the key lock 7 is located in the first position, although the restricting portion 71 is engaged with the restricting portion 60c, the upper plate portion 60 and the operating portion 71 are configured in a manner of being vertically separated by a predetermined interval. By forming this interval, if the other end side of the operating portion 71 is pushed toward the side of the upper plate portion 60, the coupling portion 72 is elastically deformed in a manner of enabling the operating portion 71 to be inclined upward toward one end side. Thus, the engagement between the restricting portion 71a and the restricting portion 60c can be released. That is, as the elastic deformation for releasing the engagement between the restricting portion 71a and the restricting portion 60c can be completed at the side of the key lock 7 (there is no need to deform the upper plate portion 60), the key lock 7 can be easily displaced from the first position to the second position through an operation on the operating portion 71.

If the key lock 7 is displaced to the second position, as the base portion 70b and the claw portion 70c are accommodated inside the through hole 63, the key 6 can be slidingly displaced to the side of the rod 3 (switched to the locked state). In this case, in a state in which the key lock 7 is located in the second position, one end of the claw portion 70c is substantially flush with an opening portion at one end side of the through hole 63 (or one end of the claw portion 70c is located at a position slightly closer to (for example, about 1 mm~2 mm) the other end side with respect to the opening portion of the through hole 63). Thus, the claw portion 70c can be exposed to the outside of the through hole 63 immediately before the coupling portion 72 abuts against the projecting portion 60b. Therefore, the temporarily locked state will not be released due to slight displacement of the key lock 7 from the first position to the second position side, and thus the temporarily locked state can be prevented from being released due to an erroneous operation.

As shown in FIG. 5A, in the temporarily locked state, the engaging portions 61b of the pair of leg portions 61 are engaged (hooked) to the engaging grooves 42b and 43b of the third side wall 42 and the fourth side wall 43. Thus, even if the key lock 7 is slidingly displaced to the second position due to an erroneous operation, the temporarily locked state still can be prevented from being released.

The lower surface of the engaging portion 61b is formed by a tapered surface that is inclined upward toward the third side wall 42 (the fourth side wall 43) side. Therefore, in the state in which the key lock 7 is displaced to the second position, if the key 6 is enabled to be slidingly displaced toward the side of the rod 3, the lower surfaces of the engaging portions 61b slide along the engaging grooves 42b and 43b, and the pair of leg portions 61 are elastically deformed, thereby releasing the engaged state between the engaging portions 61b and the engaging grooves 42b and 43b (allowing the key 6 to be displaced to the side of the rod 3). Thus, the groove portions 30 can be embedded into the groove portions 62a, and the temporarily locked state can be switched to the locked state (see FIGS. 4A and 4B).

As shown in FIGS. 4A and 4B, in the locked state, as the through hole 63 of the key 6 is connected to the through hole 41b of the second side wall 41, the base portion 70b and the claw portion 70c can be inserted into the through hole 41b of the second side wall 41 by displacing the key lock 7 to the first position. Thus, even if the key 6 attempts to be displaced in a direction away from the rod 3, the base portion 70b will still abut against an upper surface of the through hole 41b. Therefore, upward displacement of the key 6 is restricted until the base portion 70b is damaged, and therefore the locked state can be firmly maintained.

On the claw portion 70c, a tapered surface that is inclined upward from one end to the other end side of the claw portion 70c is formed, and an upper end of the tapered surface is located, in the locked state, above the other end of the upper surface of the through hole 41b. Accordingly, if the key lock 7 is displaced from the second position to the first position side in the locked state, the tapered surface of the claw portion 70c slides on the upper surface of the through hole 41b, such that the base portion 70b is elastically deformed downward, and if the key lock 7 is displaced to the first position, the claw portion 70c is enabled to be engaged with the outer surface of the second side wall 41 by an upward elastic restoring force of the base portion 70b (see FIG. 4B). Therefore, in the locked state, in order to enable the key lock 7 to be displaced from the first position to the second position side, the engaged state between the claw portion 70c and the outer surface of the second side wall 41 needs to be released, therefore, the locked state can be prevented from being released due to an erroneous operation.

Besides, the claw portion 70c is engaged with the outer surface of the second side wall 41 via the through hole 41b, therefore, it is not necessary to additionally provide, on an outer side of the second side wall 41, a part for enabling the claw portion 70c to be engaged with the holder 4 in the locked state. Therefore, even in the case where the key lock 7 is slidingly displaced in the length direction of the rod 3, the dimension of the holder 4 in the length direction of the rod 3 still can be prevented from becoming long, and thus the terminal securing device 1 can be miniaturized.

Further, the claw portion 70c is engaged with the outer surface of the second side wall 41 via the through hole 41b, therefore, an operator can be allowed to easily visually confirm the engaged state between the outer surface of the second side wall 41 and the claw portion 70c. Therefore, it can be easily determined whether or not the securing of the key lock 7 in the locked state is completed.

In this case, in order to enable the claw portion 70c to be engaged with the outer surface of the second side wall 41, for example, a following structure, i.e. a tapered surface that is inclined downward from one end to the other end side of the claw portion 70c, can be used, such that a lower end of the tapered surface is located below the lower surface of the through hole 41b in the locked state. However, in such a structure, as the claw portion 70c is enabled to be engaged with the outer surface of the second side wall 41 through the elastic restoring force of the base portion 70b toward the side of the rod 3 (downward), in order to release the engaged state, the claw portion 70c needs to be pushed upward from the side of the rod 3 having a relatively narrow space. Therefore, it takes time to release the locked state.

In contrast, according to the terminal securing device 1 of the present embodiment, in a situation where the engaged state between the claw portion 70c and the outer surface of the second side wall 41 is to be released, as only the claw portion 70c needs to be pushed toward the side of the rod 3, the locked state can be easily released.

In addition, even in the locked state, in a situation where the key lock 7 is located in the first position, the restricting portion 71a of the operating portion 71 is also located at a position closer to one end side (arrow L side) of the upper plate portion 60 with respect to the restricting portion 60c of the upper plate portion 60 (the restricting portion 71a is engaged with the restricting portion 60c). Thereby, the displacement of the key lock 7 to the second position is restricted until the restricting portion 71a passes over the restricting portion 60c (the engaged state between the restricting portion 71a and the restricting portion 60c is released). That is, in addition to the engagement with the outer surface of the second side wall 41 through the claw portion 70c, the release of the locked state is also restricted through the engagement between the restricting portion 71a and the restricting portion 60c, therefore, the locked state can be more reliably prevented from being released due to an erroneous operation.

Further, in both the temporarily locked state and the locked state, the displacement of the key lock 7 from the first position to the second position is restricted through the engagement between the restricting portion 71a and the restricting portion 60c (in both the temporarily locked state and the locked state, relative positions of the key 6 and the key lock 7 located in the first position are the same). Thus, both the temporarily locked state and the locked state can be restricted from being released through the engagement between the restricting portion 71a and the restricting portion 60c. Therefore, for example, the number of components can be reduced as compared with a case where means for restricting the release of the temporarily locked state and the locked state are provided in the temporarily locked state and the locked state, respectively. Therefore, the product cost of the terminal securing device 1 can be reduced.

Besides, even if an external force is applied to the claw portion 70c or the operating portion 71, the locked state also will be restricted, by the sliding portion 70a, from being released due to the external force. That is, the sliding portion 70a is provided between the operating portion 71 and the base portion 70b, and the sliding portion 70a is in a state of being restrained by the through hole 63 (see FIGS. 5A and 5B), therefore, it is possible to prevent the elastic deformation of the coupling portion 72 from affecting the base portion 70b side or the elastic deformation of the base portion 70b from affecting the coupling portion 72 side.

Thus, even in a case where such an external force for releasing the engaged state between the restricting portion 71a and the restricting portion 60c is applied to the operating portion 71, the engagement between the claw portion 70c and the second side wall 41 can still be prevented from being released. Further, even in a case where such an external force for releasing the engagement between the claw portion 70c and the second side wall 41 is applied to the claw portion 70c, the engaged state between the restricting portion 71a and the restricting portion 60c can still be prevented from being released. In other words, in the locked state, in order to enable the key lock 7 to be displaced from the first position to the second position, the operating portion 71 needs to be operated (the engaged state between the restricting portion 71a and the restricting portion 60c is released) while the engagement between the claw portion 70c and the second side wall 41 is released, therefore, the locked state can be prevented from being released due to an erroneous operation.

As shown in FIG. 5B, in the locked state, the engaging portions 61b are engaged with lower ends of the third side wall 42 and the fourth side wall 43 through the elastic restoring force of the pair of leg portions 61. In order to release the engaged state, the pair of leg portions 61 need to be pushed toward the side of the rod 3, therefore, the locked state can be prevented from being released due to an erroneous operation.

Besides, in the locked state, the displacement of the key lock 7 from the first position to the second position is restricted through the engagement between the claw portion 70c and the outer surface of the second side wall 41, (see FIG. 4B), and on the other hand, in the temporarily locked state, the claw portion 70c is not engaged with the second side wall 41 (holder 4) (see FIG. 3A). Accordingly, compared with the locked state, in the temporarily locked state, the key lock 7 can be relatively easily enabled to be displaced from the first position to the second position through an operation on the operating position 71.

That is, the cases that the locked state needs to be released are relatively rare (low) after the length of the control cable 2 is adjusted, and on the other hand, the temporarily locked state has to be released when the length of the control cable 2 is adjusted. Therefore, in the temporarily locked state, the claw portion 70c is not engaged with the second side wall 41 (holder 4), and the temporarily locked state can be released relatively easily, whereby the workability of adjusting the length of the control cable 2 can be improved.

In this way, in the present embodiment, when the locking portion 70 (the sliding portion 70a, the base portion 70b and the claw portion 70c) is slidingly displaced inside the through hole 63 and the key lock 7 is located in the second position, the entire locking portion 70 can be accommodated inside the through hole 63. Thereby, a part of a space for displacing the key lock 7 (locking portion 70) between the first position and the second position can be provided at a position (inside the key 6 or the holder 4) overlapping the key 6 in the length direction of the rod 3. Therefore, the dimension of the holder 4 in the length direction of the rod 3 can be prevented from becoming long, and thus the terminal securing device 1 can be miniaturized.

In addition, in order to reliably engage the rod 3 with the key 6 (to ensure an engagement area), the dimension of the key 6 in the length direction of the rod 3 is formed longer than the dimension of the key 6 in the front-back direction (arrow F-B direction). Therefore, the locking portion 70 is enabled to be slidingly displaced in the length direction of the rod 3 utilizing a long space of the key 6 in the length direction of the rod 3, accordingly, it is not necessary to increase the key 6 more than necessary even in a situation where the locking portion 70 is configured inside the key 6. Therefore, the terminal securing device 1 can be miniaturized.

Further, from the state where the temporarily locked state is secured by the key lock 7 to the state where the locked state is secured by the key lock 7, the operator needs to perform 3 steps of "enabling the key lock 7 to be displaced from the first position to the second position in the temporarily locked state", "enabling the key 6 to be slidingly displaced to the side of the rod 3" and "enabling the key lock 7 to be displaced from the second position to the first position in the locked state". Therefore, for example, as compared with a structure in which the switch to the locked state is made only by pushing the key 6 to the side of the rod 3, the switch from the temporarily locked state to the locked state due to an erroneous operation can be prevented.

Figure 6A:
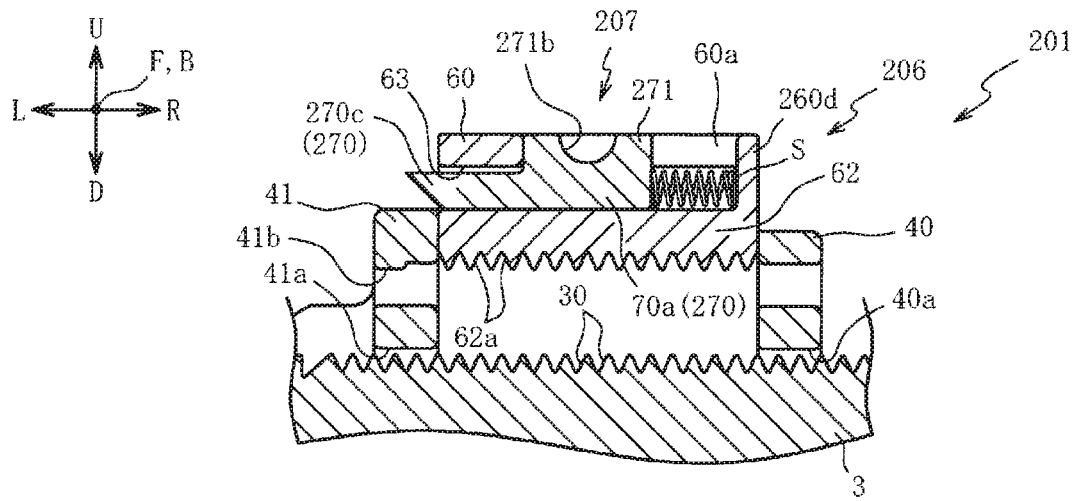
FIG. 6A is a partially enlarged sectional view of the terminal securing device in a second embodiment.
Figure 6B:
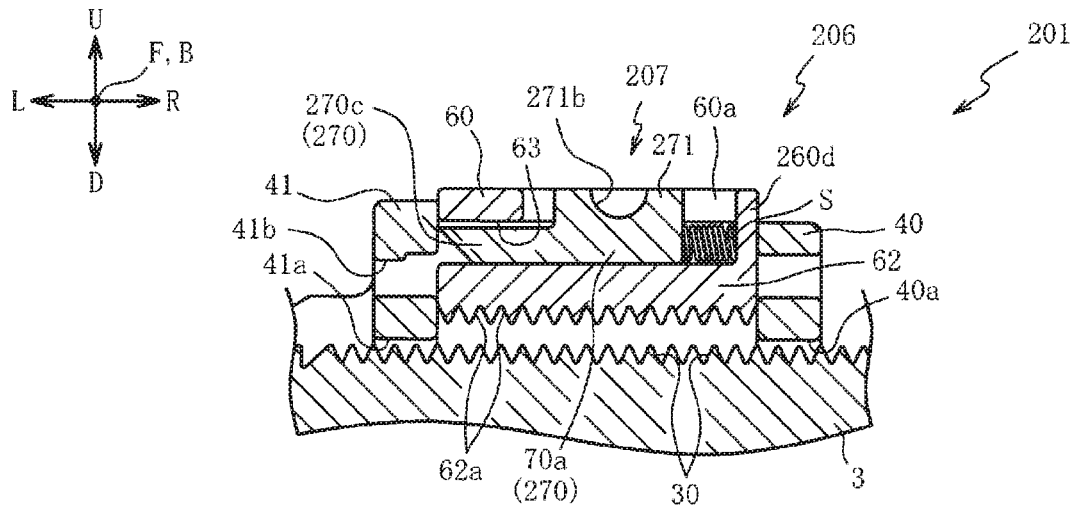
FIG. 6B is a partially enlarged sectional view showing the terminal securing device from the state of FIG. 6A to a state in which the key is in sliding displacement to the side of a rod.
Figure 6C:
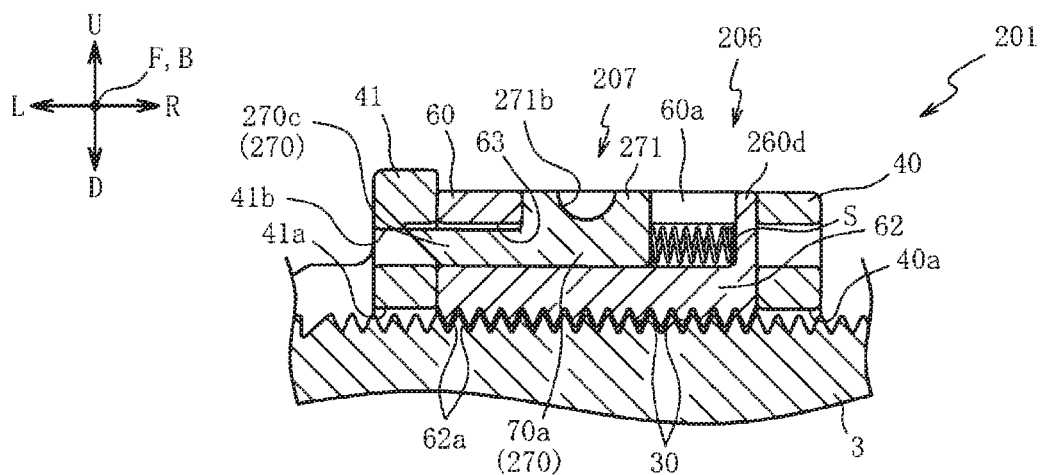
FIG. 6C is a partially enlarged sectional view showing the terminal securing device from the state of FIG. 6B to a locked state in which the key is engaged with the rod.

Next, referring to FIGS. 6A-6C, a second embodiment is illustrated. In the first embodiment, the case where the key lock 7 is enabled to be slidingly displaced through an operation on the operating portion 71 is described, and in the second embodiment, the case where the key lock 7 is enabled to be displaced through an elastic force of a spring S is described. Besides, the same portions as those in the first embodiment above are denoted by the same reference signs, and description thereof is omitted.

FIG. 6A is a partially enlarged sectional view of the terminal securing device 201 in the second embodiment, FIG. 6B is a partially enlarged sectional view showing the terminal securing device 201 from the state of FIG. 6A to a state in which the key 206 is slidingly displaced to the side of the rod 3, and FIG. 6C is a partially enlarged sectional view showing the terminal securing device 201 from the state of FIG. 6B to a locked state in which the key 206 is engaged with the rod 3. Further, FIG. 6A shows the temporarily locked state of the terminal securing device 201, and FIG. 6C shows the locked state of the terminal securing device 201.

As shown in FIGS. 6A-6C, the key 206 of the terminal securing device 201 has a wall portion 260d that closes the other end side (arrow R side) of the notch portion 60a and the through hole 63. By providing the spring S between the wall portion 260d and the locking portion 270 (the sliding portion 70a), the elastic force of the spring S toward one end side is applied to the locking portion 270.

A lower surface of a front end side of the claw portion 270c extending from the sliding portion 70a of the key lock 207 to one end side is configured as a tapered surface that is inclined downward from one end side to the other end side.

The operating portion 271 is a portion equivalent to the coupling portion 72 in the first embodiment. The upper surface of the operating portion 271 is flush with (or located slightly below) the upper surface of the upper plate portion 60, and an operating surface 271b recessed toward the side of the rod 3 is formed on the upper surface of the operating portion 271.

Besides, in the second embodiment, a following position is also defined as the first position of the key lock 207, that is, a position where the operating portion 271 is located at one end side of the notch portion 60a (the operating portion 271 abuts against the upper plate portion 60) and the claw portion 270c is exposed from the through hole 63. In addition, a position where the claw portion 270c is accommodated inside the through hole 63 is defined as a second position of the key lock 207.

In the temporarily locked state, in a situation where the key lock 207 is located in the first position, the tapered surface of the claw portion 270c is located on the upper side of the other end of the upper surface of the second side wall 41. Thus, if the key 206 is pushed to the side of the rod 3 from the temporarily locked state, the tapered surface of the claw portion 270c slides along the upper surface of the second side wall 41, and the key lock 207 is displaced to the second position against the elastic force of the spring S (see FIG. 6B). In this case, as the upper surface of the operating portion 271 is formed flush with (or slightly below) the upper surface of the upper plate portion 60, when the operator pushes the key 206 to the side of the rod 3, the operator's finger can be prevented from interfering with the sliding displacement of the key lock 207. Besides, as the upper surface of the operating portion 271 is formed flush with (or slightly below) the upper surface of the upper plate portion 60, the terminal securing device 201 can be miniaturized in the up-down direction as compared with a structure in which the operating portion 271 protrudes to an upper side of an upper surface of the upper plate portion 60.

If the key 206 is embedded into the rod 3, the through hole 63 of the key 206 is connected to the through hole 41b of the second side wall 41, and the claw portion 270c can be inserted through the through hole 41b by the elastic force of the spring S. Thus, as in the first embodiment, even if the key 206 attempts to be displaced in a direction away from the rod 3, the claw portion 270c will still abut against the upper surface of the through hole 41b, therefore, the upward displacement of the key 6 is restricted until the claw portion 270c is damaged.

Besides, when the locking portion 270 (the sliding portion 70a and the claw portion 270c) is slidingly displaced inside the through hole 63 and the key lock 207 is located at the second position, the entire locking portion 270 can be accommodated inside the through hole 63. Thereby, a part of a space for enabling the key lock 207 (locking portion 270) to be displaced between the first position and the second position can be provided at a position (inside the key 206) overlapping the key 206 in the length direction of the rod 3. Therefore, the dimension of the holder 4 in the length direction of the rod 3 can be prevented from becoming long, and thus the terminal securing device 1 can be miniaturized.

Besides, in the locked state, the claw portion 270c is accommodated inside the through hole 41b of the second side wall 41 (the claw portion 270c is not exposed from the outer surface of the second side wall 41), therefore, a front end of the rod 3 can be prevented from being covered by the claw portion 270c. Thus, it can ensure visibility of the front end portion of the rod 3, therefore, the workability of adjusting the length of the control cable 2 can be improved.

Further, the locked state is released through an operation on the operating surface 271b. That is, as the operating surface 271b is formed in a manner of being recessed toward the side of the rod 3, even in a situation where the upper surface of the operating portion 271 is flush with the upper surface of the upper plate portion 60, the key lock 207 still can be displaced from the first position to the second position through the operation on the operating surface 271b.

Figure 7A:
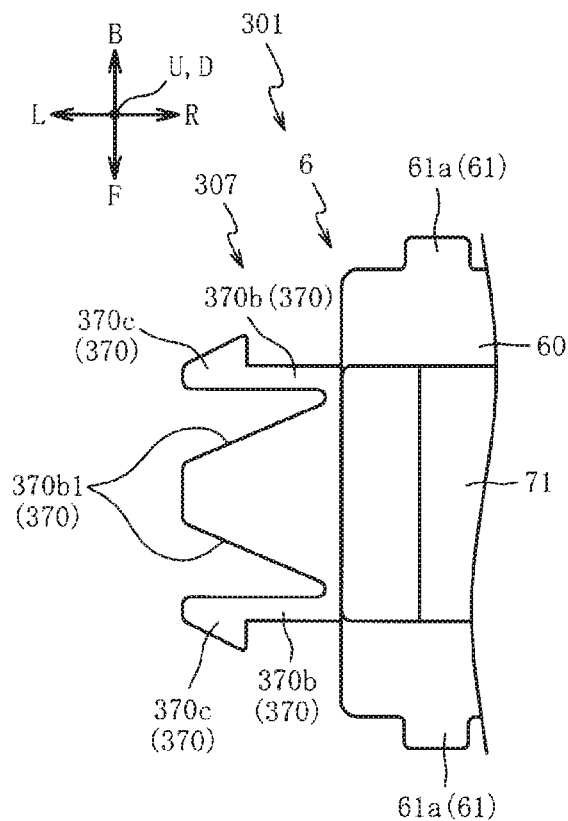
FIG. 7A is a partially enlarged top view of the terminal securing device in a third embodiment.
Figure 7B:
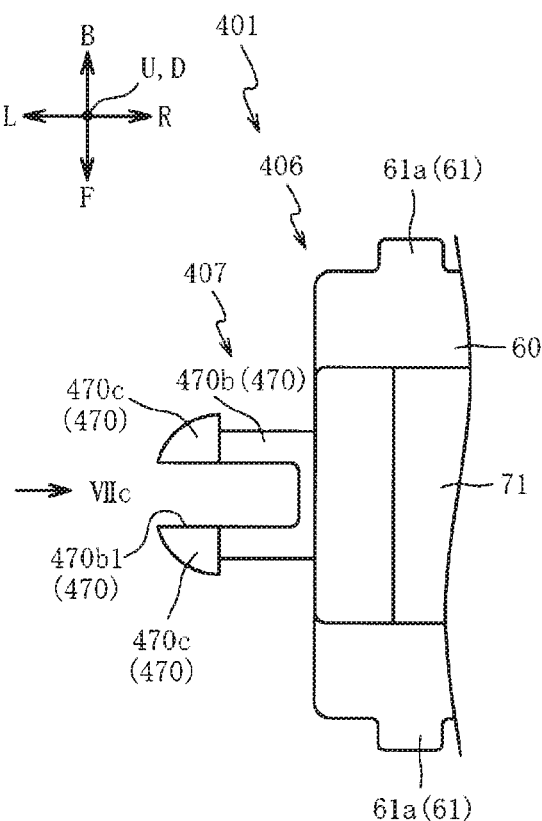
FIG. 7B is a partially enlarged top view of the terminal securing device in a fourth embodiment.
Figure 7C:
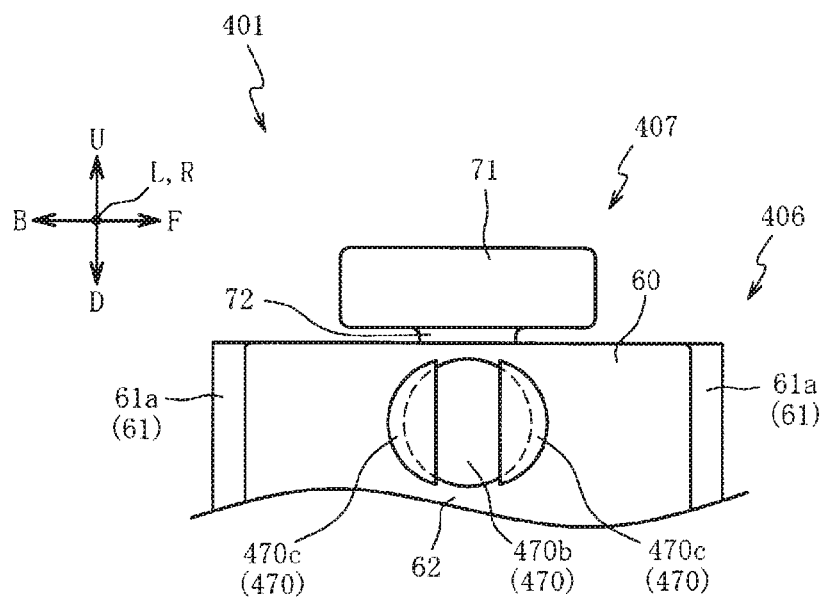
FIG. 7C is a partially enlarged side view of the terminal securing device when observed in a direction of an arrow VIIc in FIG. 7B.

Next, referring to FIGS. 7A-7C, a third embodiment and a fourth embodiment are illustrated. In the first embodiment, the case where the claw portion 70c protrudes upward from one end of the flat-plate-shaped base portion 70b is described. In contrast, in the third embodiment, a case where the claw portion 370c protrudes from one end of the flat-plate-shaped base portion 370b to the third side wall 42 and the fourth side wall 43 side is described, and in the fourth embodiment, a case where the claw portion 470c protrudes from one end of a column-shaped base portion 470b to the third side wall 42 and the fourth side wall 43 side is described. Besides, the same portions as those in the first embodiment above are denoted by the same reference signs, and description thereof is omitted.

FIG. 7A is a partially enlarged top view of the terminal securing device 301 in the third embodiment. Besides, in FIG. 7A, only a part of the key 6 and the key lock 307 is illustrated in order to simplify the drawing.

As shown in FIG. 7A, the locking portion 370 of the terminal securing device 301 in the third embodiment has a pair of claw portions 370c protruding from one end of the flat-plate-shaped base portion 370b to the third side wall 42 and the fourth side wall 43 (see FIG. 1) side.

On the claw portion 370c protruding to the third side wall 42 side, a tapered surface inclined in a manner of gradually approaching the third side wall 42, from one end to the other end thereof, is formed. Besides, on the claw portion 370c protruding to the fourth side wall 43 side, a tapered surface inclined in a manner of gradually approaching the fourth side wall 43, from one end to the other end thereof, is formed. A pair of slits 370b1 are formed on the base portion 370b, from one end to the other end side thereof, and the base portion 370b can be elastically deformed toward the slits 370b1 side.

Thus, if the claw portions 370c are inserted into the through hole 41b (see FIG. 1), the tapered surfaces of the claw portions 370c slide along a side surfaces of the through hole 41b, and the pair of claw portions 370c are engaged with the outer surface of the second side wall 41 through the elastic restoring force of the base portions 370b toward the third side wall 42 and the fourth side wall 43. Thus, in order to release the engaged state, the pair of claw portions 370c both need to be pushed toward the center side of the key lock 307 in the front-back direction (arrow F-B direction). Therefore, as compared with the case where the engagement between the claw portion 70c and the outer surface of the second side wall 41 is released by pushing the claw portion 70c to the side of the rod 3 as in the first embodiment, the engagement between the pair of claw portions 370c and the outer surface of the second side wall 41 can be prevented from being released due to an erroneous operation.

Further, by forming the slits 370b1 on the base portion 370b, in the base portion 370b, the thickness of the base portion 370b in the front-back direction, in which the pair of claw portions 370c are formed, is formed relatively thin. On the other hand, by forming the base portion 370b between the pair of opposing claw portions 370c in a trapezoidal shape protruding toward one end side, the rigidity thereof is set higher than the part where the claw portions 370c are formed. That is, even if a part of the base portion 370b is formed to be thin in order to allow deformation of the part where the pair of claw portions 370c are formed, the rigidity of the entire base portion 370b still can be ensured through the trapezoidal base portion 370b between the pair of opposing claw portions 370c. Thus, even if the base portion 370b is pressed against the upper surface of the second side wall 41 (see FIG. 2) or the lower surface of the through hole 41b, through vertical displacement of the key 6, the base portion 370b still can be prevented from being damaged.

FIG. 7B is a partially enlarged top view of a terminal securing device 401 in a fourth embodiment, and FIG. 7C is a partially enlarged side view of the terminal securing device 401 when observed in a direction of an arrow VIIc in FIG. 7B. Besides, in FIG. 7B and FIG. 7C, only parts of the key 406 and the key lock 407 are illustrated in order to simplify the drawings.

As shown in FIG. 7B, the locking portion 70 of the terminal securing device 401 in the fourth embodiment has a pair of claw portions 470c protruding from one end of a substantially column-shaped base portion 470b to the third side wall 42 and the fourth side wall 43 (see FIG. 1) side.

Outer surfaces of the pair of claw portions 470c are formed in a spherical shape. A slit 470b1 is formed on the base portion 470b in a manner of separating the pair of claw portions 470c from each other, and the base portion 470b can be elastically deformed on the slit 470b1 side.

Besides, in the case where the key lock 407 having such base portion 470b and such claw portions 470c is used, a member in which the through hole 63 (see FIG. 2) of the key 6 is formed to have a circular cross section can be used as the key 406. In addition, a holder in which the through hole 41b of the second side wall 41 is formed to have a circular cross section can be used. Thus, if the claw portions 470c are inserted into the through hole having a circular cross section, the spherical surfaces of the claw portions 470c slide along the inner surface of the through hole, and the pair of claw portions 470c are engaged with the outer surface of the second side wall 41 through the elastic restoring force of the base portion 470b toward the third side wall 42 and the fourth side wall 43. Thus, in order to release the engaged state, as in the third embodiment, it is necessary to push both the pair of claw portions 470c to the center side of the key lock 407 in the front-back direction (arrow F-B direction), therefore, the engagement between the pair of claw portions 470c and the outer surface of the second side wall 41 can be prevented from being released due to an erroneous operation. In addition, the through hole for inserting the base portion 470b or the claw portion 470c can become circular, therefore, the through hole can be easily formed.

The present disclosure is described above based on the above embodiments, but the present disclosure is not limited to the above embodiments at all, and it can be easily speculated that various modifications and improvements could be made without departing from the scope of the gist of the present disclosure.

In various embodiments above, the case where the claw portions 70c, 270c, 370c, and 470c are engaged with the holder by enabling the key locks 7, 207, 307, and 407 to be slidingly displaced with respect to the keys 6, 206, and 406 is described, but it is not necessarily limited to this, and means for enabling the claw portions 70c, 270c, 370c, and 470c to be engaged with the holder are not limited. For example, it also can be configured in such a way that the claw portions can be rotated about a predetermined shaft through a rotating operation of the operating portion, and the claw portions are engaged with an engaging portion (for example, through hole or groove) of the holder in a part of region of the rotation locus.

In the various embodiments above, the case where the key locks 7, 207, 307, and 407 are engaged with the second side wall 41 is illustrated, but it is not necessarily limited to this. For example, the side wall that is engaged with the key locks 7, 207, 307, and 407 (forming the through hole) may be any side wall of the first side wall 40 to the fourth side wall 43. In this case, the key locks 7, 207, 307, and 407 are preferably engaged with the first side wall 40. Thus, even if the claw portions 70c, 270c, 370c, and 470c are exposed from the outer surface side of the first side wall 40, the deterioration of visual confirmation of the one end side of the rod 3 still can be prevented.

In the various embodiments above, the case where the groove portions 30 and the groove portions 62a are configured as a plurality of grooves formed at equal interval with a predetermined pitch in the length direction of the rod 3 is illustrated, but it is not necessarily limited to this. For example, the groove portions 30 and the groove portions 62a may also be formed as threads having a predetermined lead angle.

In the first embodiment above, the case where the projection of the restricting portion 71a formed on the operating portion 71 and the projection of the restricting portion 60c formed on the upper plate portion 60 are engaged with each other is illustrated, as restricting means for restricting the sliding displacement of the key lock 7 with respect to the key 6, but it is not necessarily limited to this. For example, the restricting portion 71a formed on the operating portion 71 also can be formed in a convex shape (concave shape), and the restricting portion 60c formed on the upper plate portion 60 also can be formed in a concave shape (convex shape). In addition, if on a surface where the key 6 and the key lock 7 face each other, the restricting portion can be formed at any position, and the structure of the restricting portion can be applied to the second to fourth embodiments.

In the first embodiment above, the case where the claw portion 70c of the key lock 7 are not engaged with the second side wall 41 of the holder 4 in the temporarily locked state is described, but it is not necessarily limited to this. For example, the through hole for enabling the claw portion 70c to be engaged with the second side wall 41 can be formed on the second side wall 41 in the temporarily locked state. Therefore, the temporarily locked state can be prevented from being released.

In the first embodiment above, the case where the claw portion 70c of the key lock 7 are engaged with the second side wall 41 of the holder 4 in the locked state is described, but it is not necessarily limited to this. For example, in the locked state, the claw portion 70c of the key lock 7 may be not engaged with the second side wall 41 of the holder 4 (one end of the locking portion 70 is simply inserted through the through hole 41b).

In the first embodiment above, the case where the claw portion 70c is formed with the tapered surface that is inclined upward from one end to the other end side is illustrated, but it is not necessarily limited to this. For example, the claw portion 70c can be formed with a tapered surface that is inclined downward from one end side to the other end side, such that a lower end of the tapered surface is located below the other end of the lower surface of the through hole 41b in the locked state. In this case, the claw portion 70c is engaged with the outer surface of the second side wall 41 through the elastic restoring force of the base portion 70b toward the side of the rod 3, therefore, the claw portion 70c need to be pushed upward from the side of the rod 3 having a relatively narrow space, in order to release the engaged state. Thus, the locked state can be prevented from being released due to an erroneous operation.

In the second embodiment above, the description of the method for configuring the spring S inside the through hole 63 is omitted, but the spring S can be configured inside the through hole 63, for example, by forming the key 206 with 2 members so as to open the through hole 63, or forming the locking portion 270 and the operating portion 271 of the key lock 207 as separate members (after inserting the spring S and the locking portion 270 into the through hole 63, the operating portion 271 is coupled to the locking portion 270).

In the second embodiment above, the case where the operating portion 271 is inserted into the notch portion 60a (see FIG. 2) formed in the center of the upper plate portion 60 in the front-back direction (arrow F-B direction) is illustrated, but it is not necessarily limited to this. For example, the notch portion 60a can be formed in a position offset from the center of the upper plate portion 60 in the front-back direction, and the operating portion 271 is inserted into the notch portion 60a. Thus, when the key 206 is pushed, the operator's finger can be prevented from interfering with the operating portion 271, thus the temporarily locked state can be easily switched to the locked state.

What is claimed is:

1. A terminal securing device, comprising:
   a control cable,
   a rod, configured at an end of the control cable,
   a holder, supporting the rod,
   a key, being slidably displaced with respect to the holder, so as to be engaged with the rod, and
   a key lock, being displaced between a first position restricting the sliding displacement of the key and a second position allowing the sliding displacement of the key,
   wherein the sliding displacement of the key is restricted in both a temporarily locked state and a locked state through the key lock located in the first position, wherein the temporarily locked state is a state in which groove portions of the key are not engaged with groove portions of the rod, and the locked state is a state in which the key is engaged with the rod,
   wherein when the key lock is located in the second position, the key and the key lock are located such that the key and the key lock overlap with each other in a length direction of the rod,
   wherein the terminal securing device is provided with restricting portions, wherein the restricting portions are respectively provided on the key and the key lock, and restrict, by engaging with each other, a displacement of the key lock, and
   in both the temporarily locked state and the locked state, the key lock is restricted by the restricting portions from being displaced from the first position to the second position.

2. The terminal securing device according to claim 1,
   wherein the holder is provided with a through hole, which is provided on a side wall surrounding the key, and
   in the locked state, the key lock is engaged with the side wall via the through hole.

3. A terminal securing device, comprising:
   a control cable,
   a rod, configured at an end of the control cable,
   a holder, supporting the rod,
   a key, being slidably displaced with respect to the holder, so as to be engaged with the rod, and
   a key lock, being displaced between a first position restricting the sliding displacement of the key and a second position allowing the sliding displacement of the key,
   wherein the sliding displacement of the key is restricted in both a temporarily locked state and a locked state through the key lock located in the first position, wherein the temporarily locked state is a state in which groove portions of the key are not engaged with groove portions of the rod, and the locked state is a state in which the key is engaged with the rod,
   wherein when the key lock is located in the second position, the key and the key lock are located such that the key and the key lock overlap with each other in a length direction of the rod,
   wherein the holder is provided with a through hole, which is provided on a side wall surrounding the key, and
   in the locked state, the key lock is engaged with the side wall via the through hole, and
   wherein in the temporarily locked state, the key lock is not engaged with the holder, allowing the key lock to be displaced from the first position to the second position.

* * * * *